Oct. 16, 1934.    J. L. SPENCE, JR    1,977,154
CAMERA SUPPORT
Original Filed May 22, 1930    4 Sheets-Sheet 1
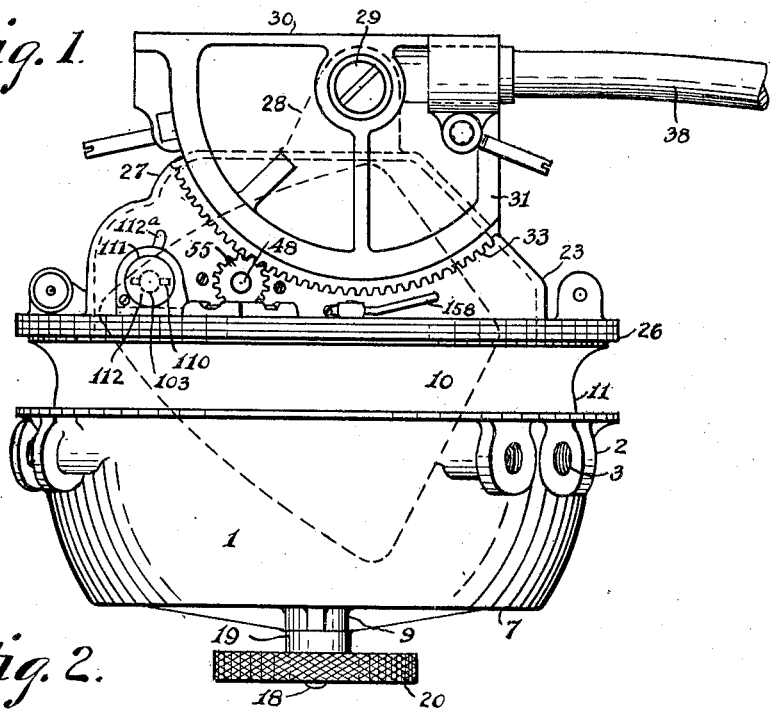
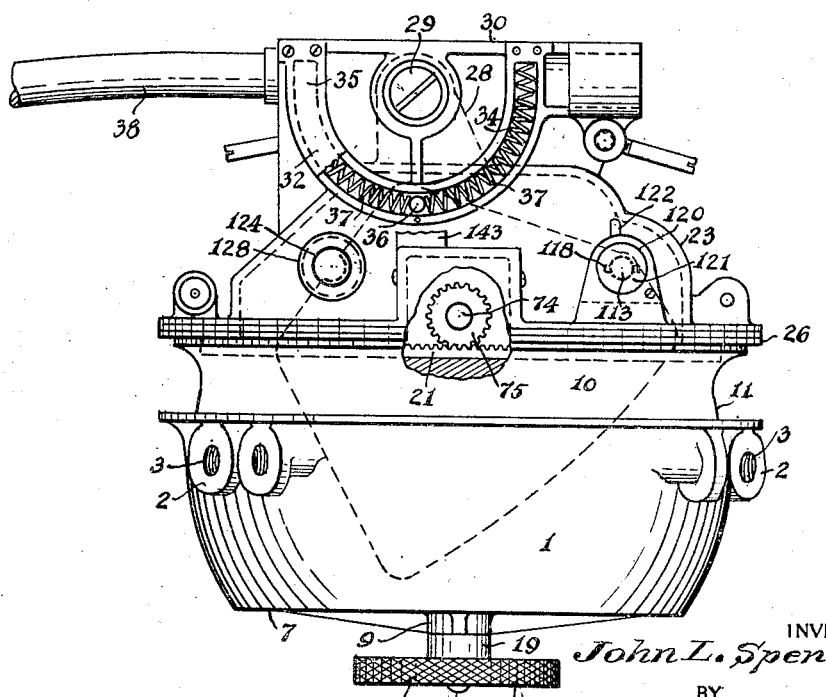
INVENTOR
John L. Spence Jr.,
BY
Harold D. Penney
ATTORNEY Oct. 16, 1934.    J. L. SPENCE, JR    1,977,154
CAMERA SUPPORT
Original Filed May 22, 1930    4 Sheets-Sheet 2
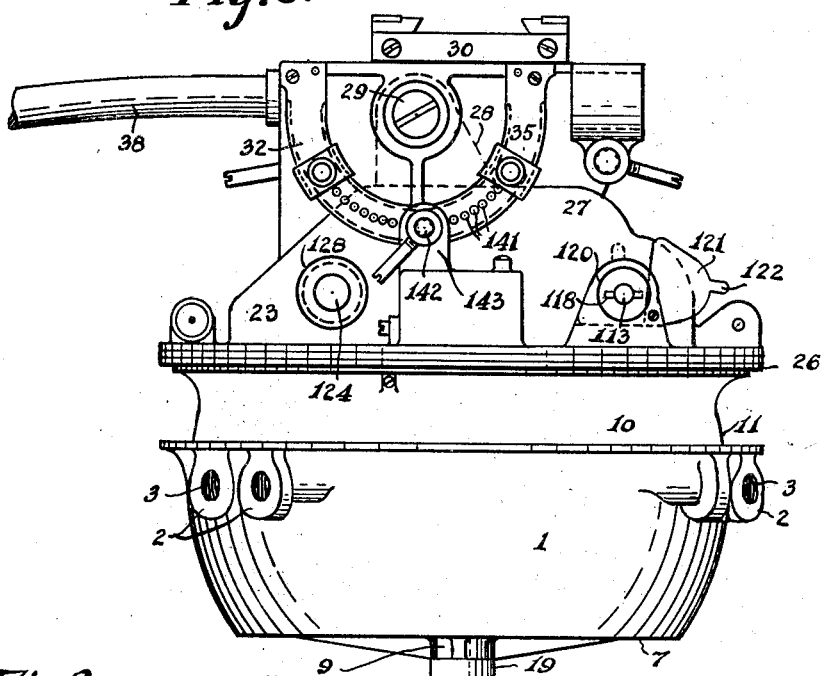
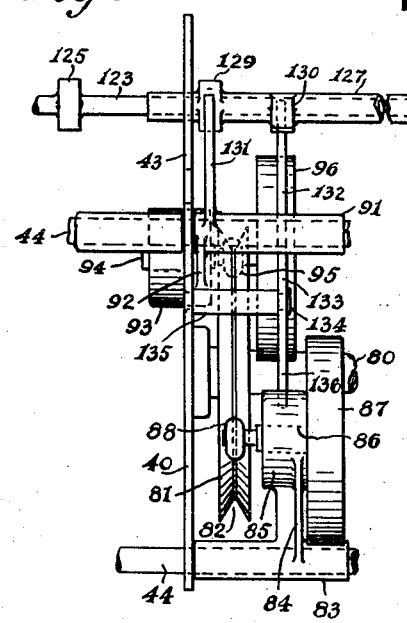
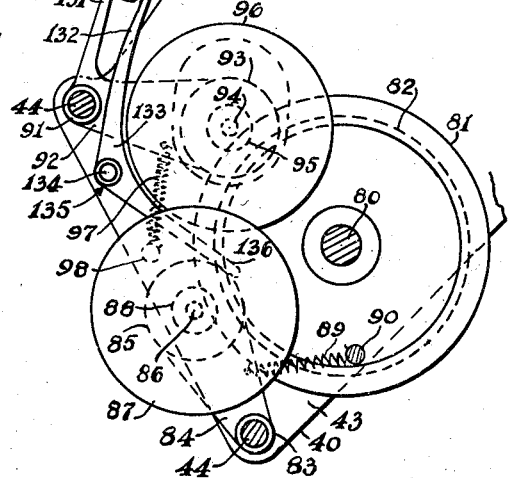
INVENTOR
John L. Spence Jr.,
BY
Harold D. Penney    ATTORNEY Oct. 16, 1934.  J. L. SPENCE, JR  1,977,154
CAMERA SUPPORT
Original Filed May 22, 1930   4 Sheets-Sheet 3
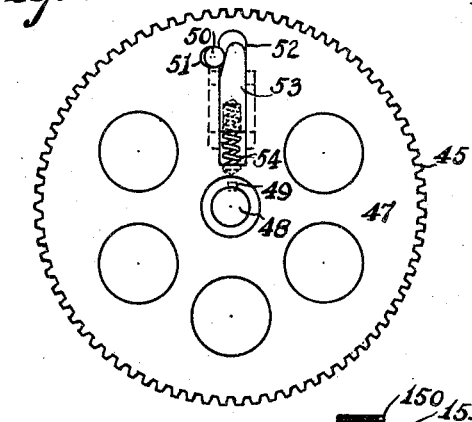
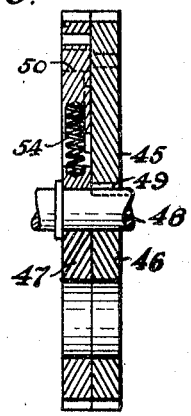
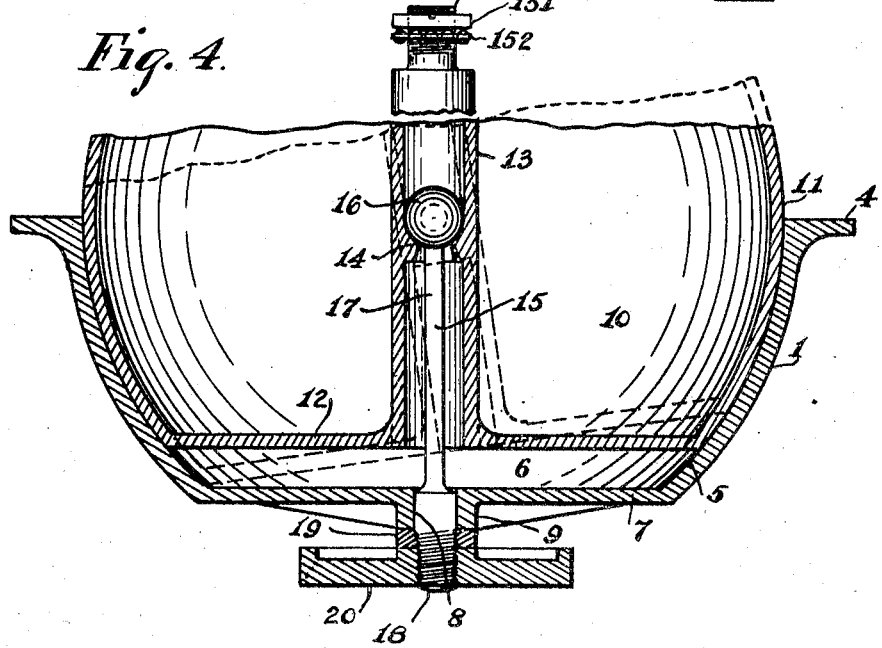
INVENTOR
John L. Spence Jr,
BY
Harold D. Penney
ATTORNEY Oct. 16, 1934.  J. L. SPENCE, JR  1,977,154
CAMERA SUPPORT
Original Filed May 22, 1930   4 Sheets-Sheet 4

INVENTOR
John L. Spence Jr.
BY Harold D. Penney
ATTORNEY

Patented Oct. 16, 1934

1,977,154

UNITED STATES PATENT OFFICE 1,977,154

CAMERA SUPPORT

John L. Spence, Jr., Brooklyn, N. Y., assignor, by mesne assignments, to The Remac Patents Corporation, New York, N. Y., a corporation of New York Application May 22, 1930, Serial No. 454,578
Renewed March 9, 1934

25 Claims. (Cl. 248—47)

The present invention relates to improvements in motion picture camera supports of the panoramic type. Its object being to provide mechanism and means for better controlling the panning and tilting movements of the camera head to insure a never failing uniform, constant steadying drag or resistance to prevent "racing" the camera when following a moving object and in other manipulations.

Another object of the invention is present in the provision of alternative means, whereby the panning and tilting movements of the parts may be accomplished with far less effort and with greater accuracy than is now possible with analogous devices now in general use.

Another object of the invention resides in the provision of resistance varying means whereby wear is practically eliminated and constancy of action is assured.

Features of construction include the provision of a bowl shaped base member having a flattened bottom and a central opening or hole therethrough; a leveling table having a spherical exterior wall surface corresponding to the interior spherical wall surface of the base member is mounted therein for universal movement; the leveling table may also have a flattened bottom from which a tubular post extends upwardly, through which a connection may be made with the tilting table of the camera head.

The tubular post may be formed with an annular seat on which a ball head of a depending tie bolt or stem may rest, the lower end of the tie bolt or stem may preferably be enlarged to slidably fit the central hole of the base member through which it passes, and its extended end is threaded to receive a washer and a hand wheel nut or other suitable device for retaining the spherical surfaces of the base member and leveling table in intimate contact and permit relative universal movements of the leveling table within determined limits.

Features of the improvements may be found in mechanism disposed within and carried by the turn-table of the camera head, and includes panning and tilting controlling gear trains or groups arranged in spaced parallel relation, with the planes of the gears vertical.

The panning gear train is driven from an annular gear rack on a leveling table member, the teeth of the rack facing upwardly. The rack is engaged by a driving gear on a horizontal shaft which also carries the master gear of the panning train, which includes alternate interconnected small and large multiplying gears and on the shaft with the last or fastest driven gear or pinion of the train, I place a preferably grooved disk or wheel of suitable material for frictionally driving at high speed preferably a pair of comparatively small rollers fixed on high speed shafts with fly-wheels; the shafts being journalled in suitable swinging frames.

Cam means are provided for controlling the operation of the flywheels so that one or both or either may be driven to enable the operator to readily change the resistance or drag in the panning gear train. This changing of resistance being accomplished by manipulating a finger knob arranged outside of the turntable cover or dome.

The tilting gear train control is similar to the opposite or panning gear train with the exception that I employ a single flywheel and its associated parts, but it may be heavier than the others if desired to obtain a determined resistance if desired.

With my construction the resistance is driven from the periphery of a high speed wheel and little or no wear can occur, thus replacements and adjustments are unnecessary as in clutch devices for the same purpose.

In motion picture camera tripods now used, the panning and tilting movements of the tripod head are accomplished by manually grasping a long lever handle attached to the tilting table, which rocks on, and is connected to the usual turntable. A resistance to the movement is set up by an adjustable system of friction clutches which are set in advance to meet each specific requirement. As the friction does not increase in direct proportion with the increase in speed of the movement applied to the long lever handle, it does not result in a smooth, accurate movement of the tripod head. This fact is especially noticeable when slow movements of the tripod head is necessary. Another method is to actuate the panning and tilting tables by two separate cranks which operate the horizontal and vertical movements separately and which necessitate the use of both hands in following a diagonally moving object and, therefore, could only be used for automatic cameras with any degree of success.

I have therefore provided alternative panning and tilting means which may be employed when extreme accuracy is desired or required. This I accomplish by driving either the panning or tilting gear train from within the turn-table itself, through shiftable shafts, one for each gear train. The shiftable shaft for operating the panning gear train carries a gear adapted to mesh with the intermediate gear of that train, whereby the panning movements may be imparted under positive control by the operator manipulating a small crank handle connected to the said shiftable shaft.

The shiftable shaft to operate the tilting gear train is provided with two gears or pinions, one being adapted, when said shaft is shifted in one direction, to engage a normally dead gear, which when the said shaft is rotated, becomes active to drive the intermediate gear of the tilting train at slow speed so that extreme accuracy of tilting angles may be attained but should a higher speed tilting movement be desired, the shiftable shaft is moved in the opposite direction to cause the other gear thereon to engage the master gear of the tilting gear train, when the said train may be operated at much higher speed.

Another feature of the invention resides in the provision of means for positively locking the tilting table against tilting movement; this I accomplish by fixing an arcuate plate to one side of the table; the plate being provided with a series of holes, with which a locking pin passing through a fixed lug or post, may engage.

A preferred embodiment of the invention is illustrated in the drawings, in which:

Fig. 1 is a side elevation of the improved camera supporting head without its supporting tripod.

Fig. 2 is an elevation of the opposite side of the device, partly broken away and in section to better disclose a feature of construction.

Fig. 3 is a side elevation similar to Fig. 2, but including an improved means for positively locking the tilting table.

Fig. 4 is a central sectional elevation of a bowl shaped base member employed and Fig. 5 is a vertical sectional elevation of the turntable with portions of the leveling table, the section being taken substantially on the dotted line 5—5 of Fig. 6.

Fig. 7 is a fragmentary side elevation showing the arrangement and means for operating and adjusting the fly-wheels of the panning gear train control.

Fig. 8 is an edge view thereof.

Fig. 9 is a detail side elevation of one of two similar master gears employed.

Fig. 10 is a central vertical sectional view thereof.

Figure 5:
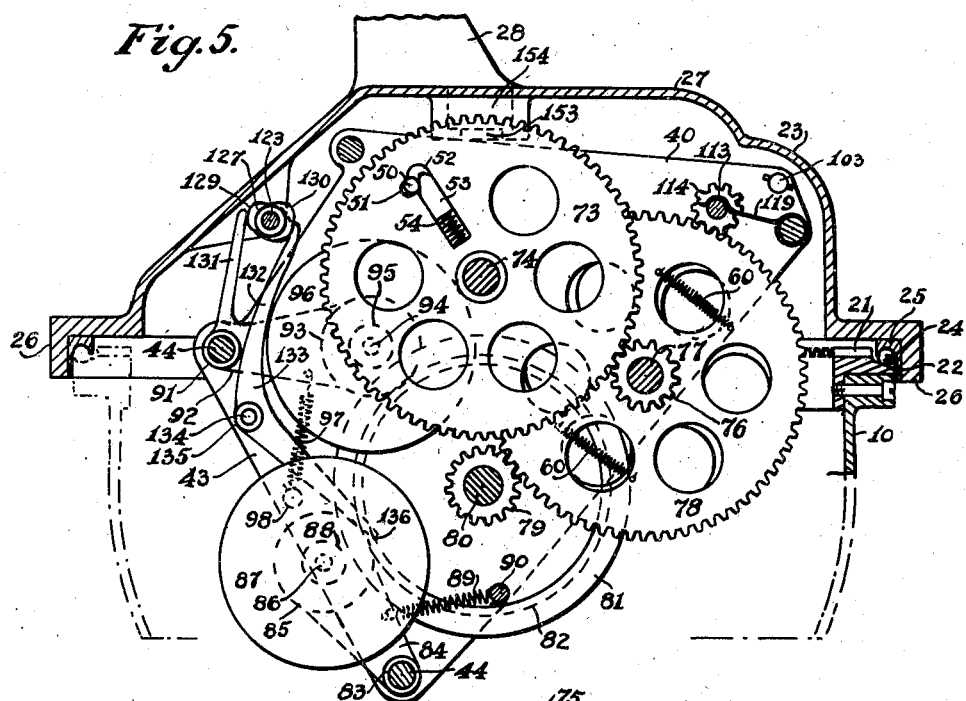

In describing the invention in detail the camera supporting head may comprise a bowl shaped base or member 1, with pairs of spaced lugs 2, having threaded bores 3, and to which the usual or any desired tripod legs may be secured.

The base 1, is formed with a rim or circumferential flange 4 and has a spherical interior face as at 5, providing a spherical socket 6. The base also has a flattened bottom 7, having a central vertical bore 8, passing through a boss 9.

A bowl shaped leveling table 10, has a spherical exterior face 11, corresponding to the arc of the inner spherical face of the base member 1, and engages the same in ball and socket relation. The leveling table has a flattened bottom 12, spaced from the bottom of the base member and centrally formed with an upright tubular portion or member 13, provided with a reduced portion intermediate its length forming a spherical socket seat 14.

A tie bar 15 is disposed within the tubular portion 13, and has a ball 16 on its upper end which rests in or engages the socket seat 14. The tie bar 15 preferably has a reduced intermediate stem portion 17, and an enlarged threaded lower end portion 18, projecting downwardly into and through the central bore 8 of the base member to receive in threaded engagement a collar 19 and a knurled hand wheel nut 20, for clamping the base member 1 and leveling table 10 together into operative engagement.

Secured to the upper edge of the leveling table 10, is an annular or circular rack 21, and outside of the teeth of said rack is an annular groove 22; the teeth of the rack being on its upper face.

A downwardly opening hollow domed turn-table 23, is rotatable co-axially with the leveling table on anti-friction devices such as balls 24, disposed between the groove 22 of the said leveling table 10 and an annular ball race 25, carried within a depending annular flange 26, of the turn-table.

Extending upwardly from the dome 27, of the turntable 23, is a pair of spaced lugs or standards 28, having alined bores in which a tiltable shaft 29 is made fast and supported on this shaft is a tiltable table 30 having depending side sectors or members 31 and 32 having alined bores receiving the ends of the shaft 29. The side sector member 31 is provided with a segmental rack 33; the other sector 32, having an arcuate slot 34, closed by a cover plate 35.

A pin 36, fast on the turn-table projects into the arcuate slot 34 centrally of its length. Helical counterbalancing springs 37 are disposed in the arcuate slot 34 and bear against the opposite sides of the pin 36; and against the opposite end walls of the said slot, as shown in Fig. 2 of the drawings, to yieldingly maintain the tilting table in its normal horizontal position.

A handle 38, is clamped to the tilting table, as shown, by which the operator may move the camera at will, for panning and tilting.

The construction and operation of the tilting table forms the subject matter of a co-pending application, Serial No. 280,014, filed May 23, 1928 and need not be further described here.

A gear frame 40 (see Figs. 5 to 8 inclusive) secured in the turn-table may comprise side plates 41 and 42 and an intermediate plate 43, all being of substantially the same shape and held in permanent spaced relation by suitable posts, pillars, tie rods or bars 44.

Mounted between the frame plates 41, 42 and 43 are a tilting control gear train and a panning control gear train; two separate and distinct mechanisms, driven and controlled from opposite sides of the turn table, one for regulating the camera movements in general vertical adjustments; the other for regulating the camera in general horizontal adjustments.

The tilting control gear train may include a master gear 45, comprising two parts 46 and 47; part 46 being keyed to a shaft 48, as at 49 and carrying a cross pin 50, projecting into an orifice 51, formed in the opposite gear part 47, and partially into a radial slot 52, also in said gear part 47.

A plunger cam 53, is mounted in the radial slot 52 and is hard urged against the cross pin 50, by a spring 54, this action being to yieldingly force the teeth of the gear sections 46 and 47 slightly out of alinement to eliminate back lash or lost motion in the driving action of the gears.

The shaft 48 carrying the master gear 45 of the tilting control train, is projected through the side wall of the turn-table dome to receive a pinion gear 55, which is always in operative connection or mesh with the segmental rack 33, of the tilting table 30.

In constant mesh with the master gear 45, is a comparatively long pinion gear 56, rotatable with one side part 57 of a two part intermediate gear 58, its other part 59, being loose on the hub of the gear part 57; the gear parts 57 and 59 are maintained in operative relation to eliminate back lash, by tension springs, similar to the tension springs 60, shown in the panning control gear train in Fig. 5 of the drawings. The gears 56 and 58 are fast to and rotate with a shaft 61, journalled in suitable bearings on the frame plates 42 and 43. The gear 56, as shown, is long enough to span both parts 46 and 47 of the master gear 45.

In constant engagement with both parts of the gear 58, is a pinion 62, fast on a cross shaft 63 to which is fixed a preferably non-metallic disk or wheel 64, provided with a circumferential groove 65 preferably of V-shape in cross section.

Extending inwardly from a sleeve 66, loose on one of the tie rods 44 of the gear frame 40, is an oscillatory or swinging arm 67, having a bearing head 68, in which a short shaft 69 may be rotated through the instrumentality of a roller 70 fixed on said short shaft and engaging the groove 65 of the disk 64, the said engagement being a yielding thrust exerted by a pull spring 71, secured at one end to the arm 67 and at the other end to to an anchor pin (not shown).

This thrust engagement is also present in the opposite or panning gear train to be hereinafter described, where it is better shown in certain figures of the drawings.

Fixedly carried on the short shaft 69 is a gyro or fly wheel 72, which is rotated at high speed through the multiplying train of gearing just described, the outside gear pinion 55 and the segmental rack 33 by manually controlled movements of the tilting table 30.

I will now proceed to describe the turn-table control gear train. This train is somewhat similar to the opposite tilting table gear train control, but includes additional simple means for adjusting or varying the gyro drag or resistance in the gear train to enable the operator to manipulate his camera under more varied conditions than has heretofore been possible in devices of this character.

In the turn table control gear train, I provide a two part master gear 73, similar in construction to the master gear 45, at the opposite side of the turn-table. It is fixed on a rotary shaft 74, with a spring connected two part drive gear 75, which has operative engagement with the annular rack 21, fast on the top of the leveling table 10 (see Fig. 2).

In constant operative engagement with the master gear 73, is a gear pinion 76, on a rotary shaft 77, with a two part intermediate gear 78, which in turn is in constant engagement with another gear pinion 79, fast on a rotary shaft 80, with a preferably non-metallic disk or wheel 81, having a peripheral, preferably cross sectionally V-shaped circumferential groove 82.

Loosely carried on one of the tie rods 44 of the gear supporting frame 40, is a sleeve 83, formed with a swingable arm 84, having a bearing head 85, in which a rotary shaft 86 operates. This shaft 86, is preferably integral with a gyro fly wheel 87, and fixedly carried on its opposite extended end is a roller 88, adapted to frictionally engage the groove 82 of the disk or wheel 81, when the gyro fly wheel 87 is to be operated.

A pull spring 89, is connected to the swinging arm 84, and to a fixed pin 90, and acts to yieldingly draw the said arm inwardly toward the grooved wheel 81.

Loosely carried on the same tie bar 44 which supports the sleeve 66 of the opposite gyro fly-wheel 72, is another sleeve 91, formed with or carrying a swingable arm 92, provided with a unitary bearing hub 93, through which a rotary shaft 94, passes to receive a roller 95. This shaft 94, like the shaft 86, is formed with or carries a gyro fly-wheel 96, and a pull spring 97, is attached to the swinging arm 92 and to a fixed post 98, to exert a pull on said arm in the direction of the grooved wheel 81 to cause the roller 95 to engage the side walls of said wheel 81 when the fly-wheel 96 is to be operated.

It will be apparent from the foregoing, that the tilting gear train control is driven or operated by movements of the tilting table, while the turn-table gear train control is driven or operated by rotary movements of the turn-table around the general axis of the camera supporting head. There are other conditions, however, in the use of moving picture cameras, when it may be desired to pan the camera with greater accuracy or precision than is usually obtainable by employing the usual handle for the purpose, and the same is true when a precise tilting angle is necessary.

For ordinary purposes, the usual handle extending from the tilting table, will adequately serve to tilt and pan the camera, but I have provided means whereby these panning and tilting movements of the camera will be under better control and the speed of such adjustments may be regulated to a finer degree of accuracy this being accomplished by means operable by other than the said handle.

This alternative means for panning and tilting, is carried on the turn-table, so that the tilting table movements and the turn-table movements may be controlled from said turn-table in contradistinction to the usual method of controlling the panning and tilting movements by the handle on the tilting table.

The alternative panning and tilting means include devices whereby the panning gear train control and the tilting gear train control may be operated separately, and in the alternative tilting control, means are provided whereby the tilting movements may be unusually rapid if desired, yet under control or by shifting a driving element the tilting movements may be unusually slow, yet under control.

In carrying out these structural features of the invention, I mount a gear wheel 100, fast with a gear pinion 101, and a sleeve 102, which are revoluble on the master gear shaft 48 of the tilting gear train control. The gear 100 is normally free of contact with any coacting element and runs "dead", but the gear pinion 101, is constantly in mesh with the gear 58 and is driven thereby when the camera is being tilted by the visual operator's handle, but in one operation of the alternative means, the reverse action takes place as the pinion 101, then drives the gear 58, as will presently appear.

Mounted for rotary and longitudinal movements in the frame plates 42 and 43, is a shift shaft 103, carrying in fixed relation, gear pinions 104 and 105. This shaft is provided with circumferential grooves 106 and 107, engageable by a spring catch member 108, pinned to one of the tie rods 44 of the gear frame 40; at the inner end of the shaft 103 is a limiting cross pin 109, and at the outer end thereof is another cross pin 110, which may be engaged by a suitable crank device (not shown) for moving the shaft longitudinally to cause pinion 104 to engage gear 100 to produce slow movement in the tilting gear train control when shaft 103 is turned by the said crank device, thus imparting slow movement to the tilting table; or the said shaft may be drawn outwardly to cause pinion 105 to engage the master gear 45 of the tilting gear train control to impart rapid movement to the tilting table, when the said shaft 103 is turned by a suitable hand crank, which may be introduced into engagement with the cross pin 110 through an opening 111, in one side of the turntable dome, said opening being closed by a suitable swinging plate or gate 112 operated through a finger piece 112a.

The turn-table gear train control may be separately driven through local or alternative means for panning said table by controlled movements, manually operated; this is accomplished by providing a small shaft 113, somewhat like shaft 103 and carrying a fixed gear pinion 114, said shaft also having circumferential grooves 115 and 116, and cross pins 117 and 118 respectively at the inner and outer ends thereof. A spring catch 119 may be provided to coact with the said grooves to yieldingly retain the shaft in the operative and inoperative positions.

Like the opposite manually operated drive shaft 103, this shaft 113 may be turned by a crank tool (not shown) introduced through an opening 120 in the side of the turn-table dome opposite to that of the one previously described; the opening being normally closed by a swinging plate or gate 121 operated by a finger piece 122.

When the crank device (not shown) is in engagement with the cross pin 118 of the shaft 113, said shaft may be drawn outwardly in its bearings in the plates 41 and 43 of the gear frame, to cause the pinion 114 thereon to slide into engagement with the gear 78, the panning gear train may then be operated by turning the shaft 113 with the said crank.

In the improved construction shown and described, it will be seen there are two gyro flywheels included in the turn-table gear train, and I have provided means whereby both of the fly wheels of this train may be in service, or both may be out of service, or either of the two may be in or out of service, and by this arrangement, I am able to vary the gyro resistance or drag on the movements of the turn-table as desired.

The means for shifting the fly-wheels as above described may be accomplished in the following manner:

A cam shaft 123 (see Figs. 6, 7 and 8) is revolubly mounted in suitable bearings in the turntable dome and is extended through a side wall thereof and carries a knurled handle or knob 124, by which said cam shaft may be rotated, and fixedly disposed on this shaft is a cam 125 against which a spring urged rock arm 126 rests. This arm projects from the sleeve 66 from which the rock arm or frame 67 supporting the gyro flywheel, also projects, thus the movements of the rock arms 67 and 126 are simultaneously controlled by rotary movements of the cam 125 to swing the roller 70 out or into engagement with the groove 65 of the disk wheel 64 which drives the gyro fly-wheel 72 through the cross shaft 69.

For operating the fly-wheel supporting rock arms or frames 84 and 92 to cause the rollers 88 and 95 to engage and disengage the flared walls of the groove 82 of the fly-wheel driving disk or wheel 81, I provide a sleeve shaft 127, revoluble on the inner shaft 123 and having a handle or knob 128 by which said shaft may be turned. This sleeve shaft carries a pair of cams 129 and 130 and yieldingly engaging the cam 129, is a rock arm 131 preferably integral with the sleeve 91 and with the rock arm or frame 92, supporting the fly-wheel 96 and the driving roller 95, thus rotary movements of the cam 129 will move the said roller 95 into and out of contact with the side walls of the groove 82 of the fly-wheel driving disk or wheel 81.

The cam 130 is yieldingly engaged by the upper arm 132, of a two arm lever 133, pivoted as at 134, to a fixed post or point 135. The lower or opposite arm 136 of the lever 133 is in sliding engagement with the bearing hub 85 of the swinging arm or frame 84 supporting the fly-wheel 87 and the driving roller 88, thus, rotation of the cam 130 will rock the lever 133 on its pivot, certain faces or lobes of the cam, acting to cause the lower arm 136 to swing the lever 84 with the fly-wheel 87 and the contact roller 88 outwardly against the pull of the spring 89, breaking the contact of the said roller 88 with the walls of the groove 82 of the fly-wheel driving disk or wheel 81, to break the fly-wheel driving connection, and when the cam 130 is turned to another position, the lever 133 may be rocked on its pivot by the pull of the spring 89 to return the lever 84 inwardly to permit re-establishment of contact of the roller 88 with the groove 82 of drive disk or wheel 81 to again operate the fly-wheel.

When the cam 129 is turned, certain faces or lobes thereon act to force the top of the lever 131 outwardly, thereby swinging the arm 92 with its fly-wheel 96 and drive roller 95 upwardly (see best Fig. 7) and away from the grooved disk wheel 81 against the pull of the spring 97 thus breaking driving contact between the said roller 95 and the groove of the said disk wheel 81; a further turn of the cam 129 will release the arm 131 permitting the fly-wheel frame arm 92 to drop or be pulled down by the spring 97, thus re-establishing driving contact between the roller 95 and the groove 82 of driving disk or wheel 81 and again operate the fly-wheel 96.

The cams 129 and 130 are so formed and arranged that the fly wheels 87 and 96 may be operated together or separately, and either may be operated as desired.

To interconnect the leveling table 11 with the turn-table to permit unretarded relative rotation around a common axis, I may reduce the tubular extension 13 (see Fig. 4) at the top to provide a stud 150, which is threaded to receive a clamp nut 151 under which a cage of antifriction devices 152 may be placed. The stud is adapted to pass through an opening 153 (Figs. 5 and 6) and into a socket 154 in the top of the turn table dome with the anti-friction devices resting on the floor of the socket as will be readily understood.

The side sector member 31, in which the balancing spring is carried, may be provided with an arcuate plate 140 (see Fig. 3) having a curved row or series of holes 141, with which a lock pin 142, projecting through a fixed lug 143, on the turn-table may engage to positively lock the tilting table against tilting movement.

Figure 6:
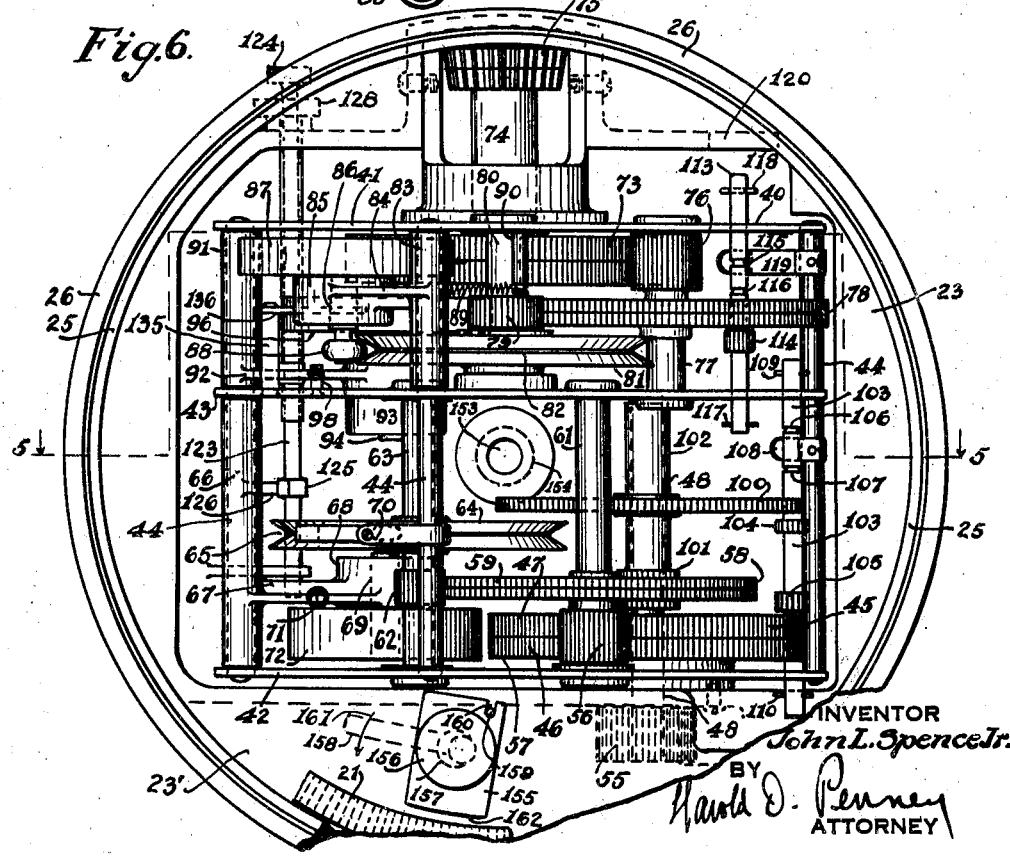
Fig. 6 is a bottom plan view of the turn-table, with the gear train controls mounted therein.

It sometimes becomes necessary to lock the table 10 to the table 23 so as to lock the tilting table for simple vertical action to the tripod. For accomplishing this purpose, the inside lower flange face 23' of the turn-table 23, Fig. 6, is located an eccentrically constructed headed stud 156, one end of which extends through the platform wall thereof and mounts a manually operable handle 158, Figs. 1 and 6. The inside headed portion of this stud supports a flat fibre brake block 155, one face of which is normally adjacent the inside face of the circular rack 21, carried by the table 10. This block 155 is provided with a guide slot 160 at one end, which engages with a fixed guide pin mounted in said flange face.

When the handle 158 is moved to position as shown in Fig. 6, the block is unlocked and free, thus leaving the tables 10 and 23 free for relative movement. When, however, the handle 158, Fig. 6, is moved in the direction of the arrow 161, the face 162 engages with the face of rack 21, and locks the tables 10 and 23 together.

I claim as my invention:

1. A camera support comprising in combination a turn-table, a tilting table movably mounted on said first table, means including gearing carried by said first table for moving said second table at one rate of speed, gearing for moving said latter table at another rate of speed, and means including a shift shaft for operating said gearings selectively.

2. A camera support comprising in combination a turn-table, a tilting table movably mounted on said first table, means carried by said first table and including gearing for moving said second table at one rate of speed, means also including gearing for moving said latter table at another rate of speed, and means for operating said gearings selectively, said latter means including a slidable shaft, and pinions on said shaft for engaging either of said gearings.

3. A camera support comprising in combination a turn-table, a tilting table movably mounted on said first table, means including gearing mounted on said first table for moving said second table at one rate of speed, gearing for moving said latter table at an increased rate of speed, means including a shift shaft for changing rate of movement of said second table, and means cooperating with said gearing and including a gyro fly wheel for steadying the aforesaid movements.

4. In a camera support of the class described, a panning member, a tilting member supported thereon, means whereby the movements of the panning member may be controlled from said tilting member, means for controlling the tilting movements of the tilting member from the panning member, and means for steadying the movements of both members.

5. In a camera support, in combination, a panning device, a tilting table movably mounted on said device, means including gearing for controlling the operation of said device, means also including gearing for selectively controlling the movement of said tilting table, and means for steadying the movement of said last mentioned gearing.

6. In a camera support of the class described a base member, a leveling table mounted for universal rocking movement therein, a turn-table, a tilting table, means operated from the turn-table for imparting operative movements thereto, means also operated from said turn-table for imparting operative tilting movements to said tilting table and means for steadying said movements.

7. In a camera support of the class described, a base member, a leveling table, an annular rack fast on said leveling table, a turn-table and a tilting table, means operated from said turn-table and in connection with said rack whereby the operative movements of the turn-table may be controlled, selective means also operated from said turn-table for tilting the tilting table and means for steadying said movements.

8. In a camera support of the class described, a base member having a spherical wall, a flat bottom, and a central opening, a leveling table having a spherical wall, a flat bottom and a central tubular extension formed with a spherical seat, a tie bar having a ball at its top and resting in said seat, said tie bar also having an enlarged lower end extending downwardly through the central opening in said base member and threaded, locking nuts on the threaded end to tie the said members together, a turn-table and a tilting table, means operated from the turn-table for panning the turn-table and for tilting the tilting table and means for steadying the panning and tilting movements.

9. In a support for motion picture cameras a base member, a leveling table in rockable connection therewith, a gear rack thereon, a turn-table and a tilting table; a gear train operatively connected to said gear rack, a second gear train in operative connection with said tilting table, a friction driving wheel in each of said gear trains, fly wheels operated from the periphery of said friction driving wheels and means for moving the fly wheels and their driving means toward and away from the said friction driving wheels to control their operation.

10. In a support of the class specified, a turn-table, a tilting table, a panning control gear train and a tilting control gear train, a friction drive wheel in each of said trains, fly wheels and operating rollers mounted to swing toward and away from said friction drive wheels, means for normally urging the rollers into contact with the drive wheels and means for withdrawing said rollers out of contact therewith.

11. In a support of the class described, a turn-table, a tilting table, a panning control gear train and a tilting control gear train, a friction drive wheel in each of the trains, each of said wheels having a peripheral groove, a frame for supporting said gear trains, arms mounted to oscillate on said frame, fly-wheels and rollers rotatably mounted on said arms, means for urging the rollers in contact with the grooves of the friction drive wheels and means for moving the rollers out of contact with said grooves.

12. In a camera support of the class described, a turn-table, a tilting table mounted thereon, means for steadying the operative movements of the turn-table, means for steadying the operative movements of the tilting table, said means including friction driving wheels having peripheral grooves, drive rollers and associated fly-wheels, and means for causing said rollers to engage and disengage the said grooves of said driving wheels.

13. In a camera support of the class described, a turn-table, a tilting table mounted thereon, means for steadying the operative movements of the turn-table, means for steadying the operative movements of the tilting table, the turn-table steadying means including a peripherally grooved friction drive wheel and a plurality of swinging arms, fly wheels and associated drive rollers mounted to rotate thereon, means for normally urging all of said drive rollers into contact with the said grooved friction drive wheel and means for moving one, either or all of said rollers out of contact with said drive wheel.

14. In a camera support of the class described, a turn-table, a tilting table mounted thereon, means for steadying the operative movements of the turn-table, means for steadying the operative movements of the tilting table, means for varying the action of the said steadying means, selective means operable from said turn-table for tilting the tilting table and means also operable from the turn-table for imparting panning movements to itself.

15. In a camera support of the class described, a turn-table, a tilting table thereon, a panning gear train, swinging resistance devices operable thereby, a tilting gear train, a swinging resistance device operable thereby, and selective means mounted for operative connection with said gear trains whereby panning and tilting movements may be imparted to said tables.

16. In a camera support of the class described, a turn-table, a tilting table supported thereon, a panning gear train, swinging resistance devices frictionally driven thereby, a tilting gear train, a swinging resistance devices frictionally driven thereby, means shiftable into contact with a gear of each train for selectively imparting panning movements to the turn-table or tilting movements to the tilting table.

17. A camera support of the class described comprising a horizontally disposed hollow turntable, a tilting table having sectors movably embracing said first table, a panning gear train and a tilting gear train disposed within said turntable, means including a shaft having a pinion shiftable into engagement with a gear of the panning gear train whereby the turn-table may be panned, and shiftable means including another shaft having a pinion for selective engagement with a gear of the tilting gear train whereby the tilting table may be tilted.

18. In a camera support of the class described, a turn-table, a tilting table supported thereon, a panning gear train, a tilting gear train, swingable resistance devices adapted to be driven thereby, a panning shiftable shaft, a gear thereon, adapted, when its shaft is shifted, to engage a gear of the panning gear train and whereby the turn-table may be panned, a tilting shiftable shaft, gears thereon, adapted, when their shaft is shifted, to selectively engage a gear of the tilting gear train and whereby the tilting table may be tilted.

19. In a camera support of the class described, a turn-table, a tilting table thereon, means for steadying the movements of the turn-table, means for steadying the movements of the tilting table and means for positively locking the tilting table against tilting movement relative to said turn-table, said locking means comprising an arcuate plate on the tilting table having a series of perforations and a device on the turn-table adapted to selectively engage said perforations.

20. In a camera support of the class described, a base member having a spherical wall a flattened bottom and a central hole through said bottom and surrounded by a boss, a leveling member having a spherical wall, a flattened bottom and a centrally arranged upwardly directed post having a bore registering with the hole of the base member, the bore having a reduced portion to provide a seat, a tie member having a ball head resting on said seat, a shank portion extending downwardly through said bore and a threaded end extending through the said hole of the base member, a lock washer and a hand nut on said threaded end to retain said members in assembled operative relation, a gear rack on the leveling member, a turn-table, a tilting table, means engaging said rack for steadying the movements of the turn-table and means for steadying the movements of the tilting table.

21. In a camera support of the class described comprising a turn-table, a tilting table having side sectors, swingable for steadying the relative movements of the tables in the panning and tilting operations, means on said turntable and means on one of said sectors of the tilting table adapted for coactive engagement for locking the tilting table against tilting movement relative to said turn-table, said latter means including a lug on said turn-table, and a lock pin carried by said lug for selectively engaging said last mentioned sector which is provided with holes for receiving said pin.

22. In a camera support of the class described, movable panning and tilting members, variable inertia means driven from said first member, and a crank actuated means disconnectably cooperating with said latter member for selectively actuating said latter member.

23. In combination, a support; a turntable thereon; means for supporting a camera on the turn table; means for steadying the turning movement of the turntable including a gear train and a pair of inertia members; and means to bring either one or both of said members in driven relation with said train.

24. In a camera support of the class described comprising relatively movable hollow panning and tilting members having therein a gear train for operating said first member and a gear train for operating said second member, inertia means also disposed within said members and having external means for operating said second gear train, and variable inertia means also disposed within said members and having an external crank operated terminal for selectively controlling operation of said first gear train.

25. A camera supporting mechanism including in combination a turn-table, pivot means, a tilting table mounted on the first mentioned table and pivoted on said means for movement between elevated and lowered positions, means disposed between said tables for steadying the aforesaid tilting movement, a pin rigid with said turn-table and positioned distant from the first mentioned means, and a pair of cooperating coil springs carried by said tilting table and terminably engaging said pin, whereby to hold said tilting table in any intermediate position, said springs being disposed on an arc having its center on said pivot means.

JOHN L. SPENCE, Jr.